Jan. 13, 1948. V. SPENCER 2,434,292
APPARATUS FOR MAKING VARIEGATED HARD SURFACE COVERING
Original Filed Oct. 2, 1940 2 Sheets-Sheet 1
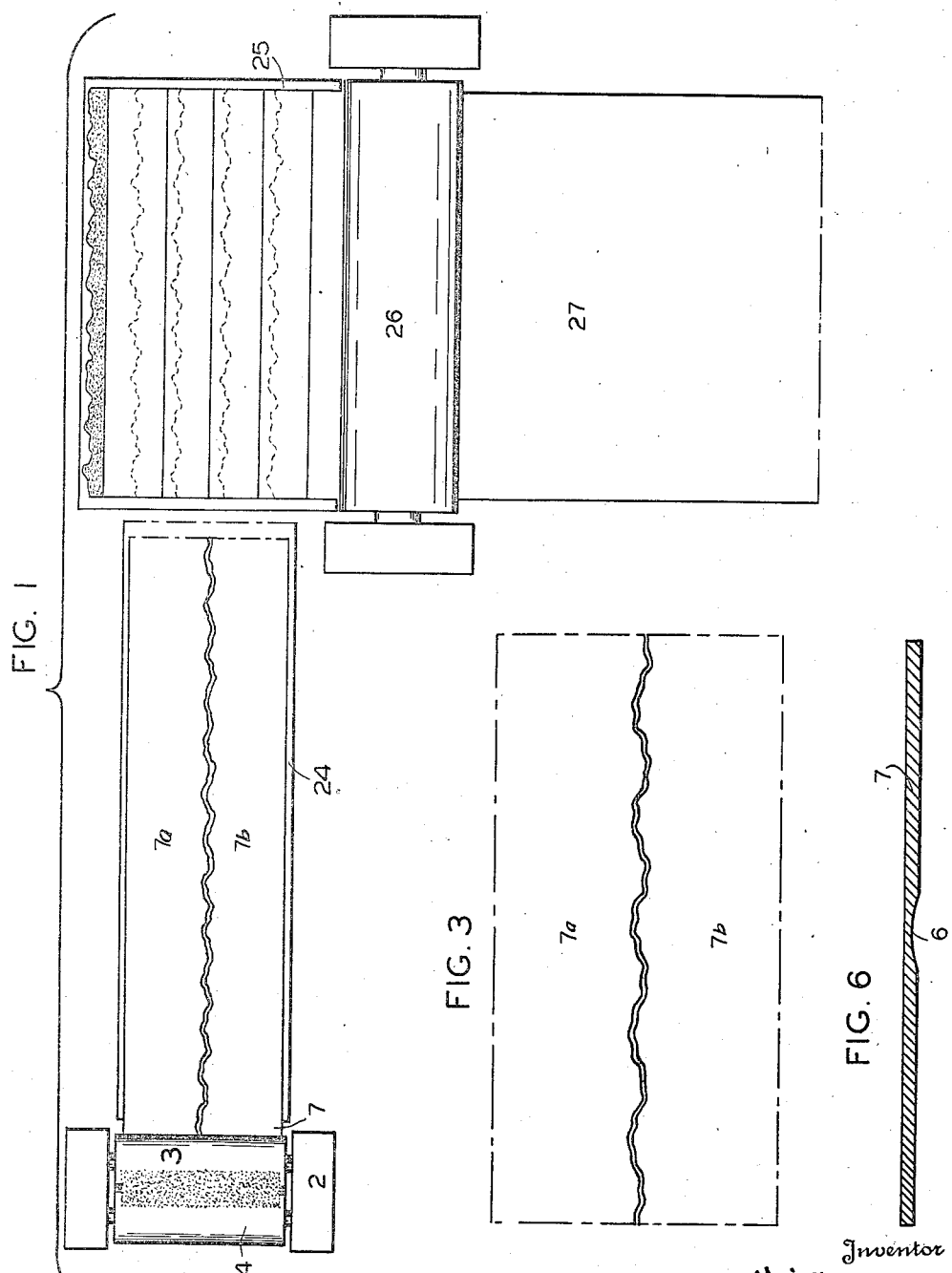

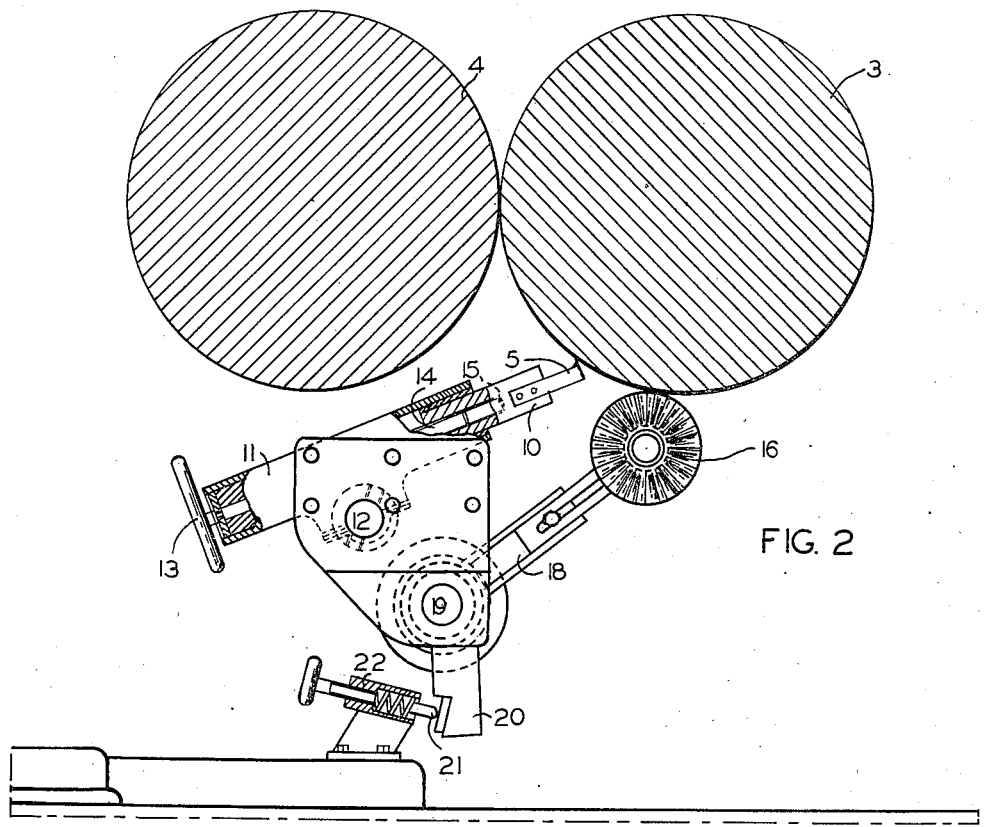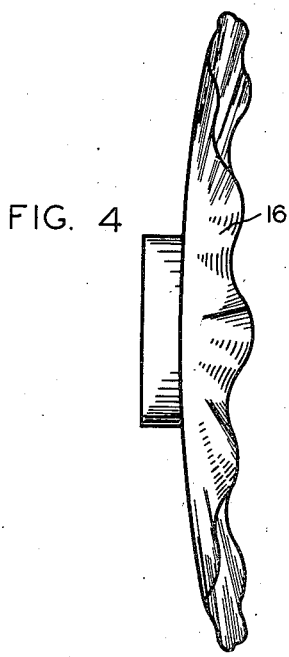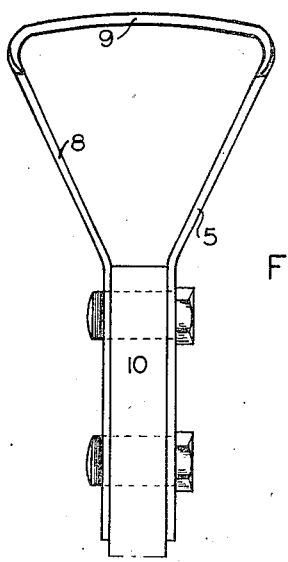

Patented Jan. 13, 1948

2,434,292

UNITED STATES PATENT OFFICE 2,434,292

APPARATUS FOR MAKING VARIEGATED HARD SURFACE COVERING

Virgil Spencer, East Petersburg, Pa., assignor to Armstrong Cork Company, Lancaster, Pa., a corporation of Pennsylvania Original application October 2, 1940, Serial No. 359,328. Divided and this application June 20, 1944, Serial No. 541,188

6 Claims. (Cl. 18—2)

This application is a division of my copending application, Serial No. 359,328, filed October 2, 1940, entitled "Method of making variegated hard surface covering," now Patent No. 2,369,866, and relates to an apparatus for making variegated hard surface covering, and more particularly to improvements in an apparatus for making variegated linoleum by what is generally termed the "cross-rolling" process.

The cross-rolling process of making variegated linoleum as applied to the continuous production of linoleum on rotary inlaying machines of the Walton or Batten type contemplates the formation of a sheet having a definite directional graining commonly called "jaspé," overlapping a plurality of such sheets and passing the overlapped sheets through a sheeting calender at right angles to the direction of graining thus forming an integral sheet and shortening and spreading the jaspé graining of the face of the sheet to obtain the desired variegation which is generally considered to resemble marble. It is known that graining produced by this process varies throughout the thickness of the sheet and that the graining of the back of the sheet bears only a remote resemblance to the graining on the face of the sheet.

One of the chief problems present in such practice resides in the visible discontinuity between sheets where an overlapped or overlapping sheet adheres to and becomes an integral portion of a following or preceding sheet. This phenomenon is termed "hook-on" in the industry and appears to be a visible distortion of face graining which is not compatible with the required variegation and presents an entirely different appearance at the sections where the overlapped sheets join one another. The cause of "hook-on" is not known with any degree of certainty but it is believed to be due almost entirely to the abrupt change in volume of material present in the nip of the rolls at the overlapped portions of the sheet and the subsequent flow and surge of the plastic material resulting from increased pressure. It may be due in part to the fact that in some cases the edge portions of the overlapped sheets presented to the calender rolls turn over slightly when subjected to pressure and thus permit back graining to appear on the face of the sheet. In any event, this visible discontinuity is a serious distortion of face graining which is undesirable and which annually creates an enormous waste in the production of variegated linoleum on rotary inlaying machines.

The chief object of my invention is to provide improvements in apparatus for making variegated hard surface covering by the cross-rolling process designed to eliminate substantially or entirely the visible discontinuity present in those portions of the finished sheet where overlapped sections join. An object of my invention is to provide apparatus capable of removing a ribbon from a sheet of plastic linoleum composition. A further object is to provide an apparatus for producing variegated linoleum which is economical in operation and highly satisfactory in service. A still further object is to obviate the abrupt change in volume of plastic composition at those places where one sheet joins and adheres to a second sheet in the manufacture of variegated hard surface covering.

This invention relates to a device for making variegated hard surface covering comprising in combination a sheeting calender adapted to form a sheet having a definite directional graining and means adapted to skive a formed sheet to form an edge portion of less thickness than the body of the sheet.

This invention further relates to a device for making variegated hard surface covering comprising in combination a sheeting calender adapted to form a sheet having a definite directional graining, a skiving tool disposed adjacent thereto adapted to form a recess extending longitudinally of a formed sheet, means for forming an irregular edge at the recessed portion of the sheet, and means for cross-rolling a plurality of sheets disposed in overlapping relationship with the irregular edge of one sheet disposed adjacent the face of a second sheet to form a continuous integral sheet.

The attached drawings illustrate a preferred embodiment of my invention in which Figure 1 is a plan view of a device for making variegated hard surface covering by the cross-rolling process;

Figure 2 is a view partly in elevation and partly in section of a portion of the device shown in Figure 1, the frame of the device being removed to illustrate the skiving and edge forming mechanism;

Figure 3 is an exaggerated plan view of a sheet severed into sections provided with an irregular sinuous edge;

Figure 4 is a view in elevation of the edge forming tool used in my process;

Figure 5 is a view in elevation of the skiving tool; and

Figure 6 is a sectional view of a sheet of linoleum composition serving to illustrate the skived recess formed in its under surface.

Suitable mixing equipment is provided for forming two differently colored linoleum compositions. It will be appreciated suitable equipment may be provided for any desired number of differently colored compositions. The differently colored compositions are blended into a cohesive vari-colored mass which is fed to a two-roll sheeting calender 2 as shown in Figure 1. The face roll 3 of the calender 2 is maintained at a lower temperature than the back roll 4 in order to insure that a formed sheet will adhere thereto rather than to the back roll 4 and to assist in securing the desired graining. The roll 3 is rotated at the same or a slightly greater speed than the roll 4 which extrudes the granules and elongates the differently colored granules to some extent thus forming what is known as a jaspé sheet. A doctor blade (not shown) is usually provided to remove the jaspé sheet from the roll 3. Such equipment is well-known in the industry and does not require lengthy description for a full and complete understanding of my apparatus and method. I have found it desirable in the substantial elimination of "hook-on" to provide a recess or groove in the under surface of the formed jaspé sheet in order that, when a sheet is severed in sections, each section will be provided with a thin tapered edge of less thickness than the body of the section. This, of course, materially reduces the volume of plastic composition present in the nip of the cross-rolling calender at those points where overlapped sheets are joined. Such groove or recess is preferably provided in the center of the sheet as shown in Figure 6 but it will be understood it may be provided at any desired position in the sheet. If it is not desired to later sever the sheet in sections, such groove or recess may be formed at one edge of the sheet to insure such edge being of less thickness than the body of the sheet. For this purpose there is provided a skiving tool 5 (refer to Figure 2) which serves to skive or form a recess or groove 6 in a formed jaspé sheet 7. The skiving tool 5 is preferably disposed adjacent the roll 3 in order that the roll 3 may serve as a platen therefor but it will be understood the tool 5 may be used to skive a groove in the sheet 7 after it has been removed from the roll 3. In such case, a suitable backing plate or platen need be provided. The tool 5 skives a thin tapered ribbon from the sheet 7 leaving a tapered groove or recess therein. If desired to eliminate waste or scrap, such ribbon may be fed again with the vari-colored mass to the rolls of the calender to form further portions of the sheet.

The skiving tool 5 preferably consists of a thin metal strip 8 having a sharpened and tapered edge 9 bent into the form shown in Figure 5. The tool 5 is bolted to a metal bar or rod 10 held in a barrel 11 adjustably mounted upon a shaft 12 extending across the device. The skiving tool 5 need be adjustable with precision since the sheet 7 from which it skives a ribbon is usually quite thin. To adjust the skiving tool 5, there is provided a handwheel 13 secured to a threaded rod 14 which extends through the barrel 11 and into a threaded opening 15 provided in the bar 10. The bar 10 is keyed to the barrel 11 to prevent its rotation. Rotation of the handwheel 13 causes rotation of the threaded rod 14 permitting the bar 10 to be raised and lowered in the barrel 11 to move the skiving tool 5 toward and from the roll 3 thus varying the depth of the recess or groove skived in the formed sheet. It will be appreciated such adjusting mechanism permits grooves to be formed of any desired depth or even if desired the separation of the sheet in sections by completely cutting through the sheet.

It is desirable that the edge of the formed sheet which is disposed adjacent the face of the subsequent or preceding sheet be irregular in contour and have some portions thereof extending beyond the body of the sheet to a greater extent than other portions since this materially reduces the volume of plastic material present in the nip of the cross-rolling calender when overlapped sheets are joined and made into an integral sheet. I have found that an irregular sinuous edge composed of a plurality of connected, undulated sigmoidal curves materfally aids in reducing visible discontinuity. The term "plurality of connected, undulated sigmoidal curves" is used herein to define a line formed of a plurality of connected curves which open in opposite directions and each of which has a wavy contour, as shown in Figure 3.

I provide a circular edge forming or severing tool 16 having its cutting surface formed of a plurality of connected sigmoidal curves of wavy contour (see Figure 4). Preferably, the tool 16 is likewise disposed adjacent the roll 3 in order that such roll may serve as a platen therefor and is supported by a lever 18 pivoted on a shaft 19 extending across the device. The lower portion 20 of the lever 18 engages and is held in contact with a pin 21 held in a support 22. As the pin 21 is moved outwardly, it rotates the lever 18 about the shaft 19 to move the severing tool 16 upwardly toward the roll 3. As the pin 21 is retracted within the support 22, the weight of the severing tool 16 is sufficient to rotate the lever 18 about the shaft thus moving the tool 16 in the opposite direction. The tool 16 is adjustable laterally of the shaft 18 in order that the sheet may be severed in sections of any desired width. Preferably, the cutter 16 is so disposed that the sheet 7 is severed in sections at the recessed portion so that each section terminates in an irregular tapered edge. Thus similar sections 7a and 7b are produced each of which possesses a tapered irregular sinuous edge. The sections are placed on a conveyor 24 which carries them to a table 25 positioned adjacent the rolls of the cross-rolling calender 26. Such sections 7a and 7b while traveling on the conveyor are subdivided, either manually or mechanically, into suitable size to be fed to the cross-rolling calender 26.

The subdivided sheets are disposed in overlapping relation on the table 25 with the tapered irregular edge of one sheet disposed adjacent the face of the other sheet. As shown in Figure 1, the sections are fed to the cross-rolling calender face-down and accordingly the irregular edge of the sheet is the rear edge. Of course, if the continuous sheet 27 is to be formed face-up, the irregular edge would be that edge of the sheet first fed to the cross-rolling calender. The overlapped sheets are fed to the rolls of the cross-rolling calender 26, at right angles to form a continuous integral sheet 27 and to further shorten and spread the graining to form variegations on the face thereof which resemble marble.

In operation, a cohesive vari-colored mass of linoleum composition is fed to the two-roll calender 2 and formed into a sheet 7 having a definite directional graining. While the sheet 7 adheres to the cold roll 3, the skiving tool 5 skives a portion of the under surface of such sheet so as to reduce its thickness, preferably at its central portion. The edge forming tool 16, then, while the sheet still adheres to the cold roll, severs the sheet at the skived portion thereof into two sections each of which is provided with a tapered, irregular sinuous edge composed of a plurality of connected, undulated sigmoidal curves. The sections are doctored from the cold roll 3 and placed upon a conveyor 24 which carries them to the cross-rolling calender 26. During their passage on the conveyor 24, the sections are subdivided, manually or mechanically, into sheets of suitable size for feeding to the cross-rolling calender.

The sheets are placed in overlapping relationship on the table 25 with the tapered irregular edge of one sheet disposed adjacent the face of the other section and are fed to the rolls of the cross-rolling calender 26. As shown in Figure 1, such sheets are fed face-down so that the irregular edge is the rearward edge of the sheet. The sheets are cross-rolled to spread and shorten the graining and to form a continuous integral sheet which may be placed upon a suitable backing or fed to the dies of the rotary inlaying machine as well-known in the industry.

The practice outlined above substantially or entirely eliminates the visible discontinuity between overlapped sheets. Distortion of face graining at the overlapped edges does not occur to any substantial extent and accordingly, a continuous variegated linoleum sheet is produced in which the graining presents substantially the desired appearance over the face of the sheet. The enormous waste created by "hook-on" is entirely eliminated and a more desirable and decorative sheet is produced. The improvements in the cross-rolling process above described add little or nothing to the costs involved in making the sheet. The additional apparatus required in order to effectuate such improvements is inexpensive and does not require frequent replacement. Needless to say, however, the chief advantage of my invention resides in the substantial or entire elimination of grain distortion at those sections of the continuous sheet where overlapped sheets are adhered to one another.

While I have described and illustrated a preferred embodiment of my invention, it will be understood my invention is not so limited since it may be otherwise embodied or practiced within the scope of the following claims.

I claim:

1. In combination with a sheeting calender, a skiving tool adapted to form a tapered recess extending longitudinally of the under surface of a sheet of hard surface covering material, means to adjust said tool to vary the depth of the recess, and a rotary knife having a cutting edge composed of a plurality of connected, undulated sigmoidal curves engageable with said formed sheet in the recessed area thereof for severing said sheet at the recessed portion thereof into sections each of which possesses an irregular tapered edge composed of a plurality of connected, undulated sigmoidal curves.

2. In combination with a sheeting calender, a skiving tool adapted to form a tapered recess extending longitudinally of the under surface of a sheet of hard surface covering material, means to adjust said tool to vary the depth of the recess, and a rotary knife having an undulated cutting edge engageable with said formed sheet in the recessed area thereof to sever said sheet at the recessed portion into sections having an irregular tapered edge composed of a plurality of connected, undulated curves.

3. In a device for making a variegated sheet of hard surface covering, the combination of a sheeting calender adapted to form a sheet having a definite directional graining, a skiving tool disposed adjacent thereto adapted to form a tapered recess extending longitudinally of the under surface of a formed sheet, means to adjust said tool to vary the depth of the recess, and a rotary knife having a cutting edge composed of a plurality of connected, undulated sigmoidal curves engageable with said formed sheet in the recessed area thereof to sever the sheet at the recessed portion into sections having an irregular tapered edge composed of a plurality of connected, undulated sigmoidal curves.

4. In a device for making a variegated sheet of hard surface covering, the combination of a sheeting calender adapted to form a sheet having a definite directional graining, a skiving tool disposed adjacent thereto adapted to form a recess extending longitudinally of the under surface of a formed sheet, means to adjust said tool to vary the depth of the recess, and a circular knife having a cutting edge composed of a plurality of connected, undulated sigmoidal curves engageable with said formed sheet in the recessed area thereof to sever said sheet at the recessed portion into sections having an irregular edge composed of a plurality of connected, undulated sigmoidal curves.

5. In combination with a sheeting calender, a skiving tool disposed adjacent said calender to engage a sheet of hard surface covering material formed on the calender and movable therewith to skive a narrow curved portion therefrom longitudinally of the undersurface of the sheet, and a rotary knife positioned adjacent said calender and forward of said skiving tool in the direction of travel of said sheet to engage said sheet in the recessed area thereof and sever it into two sections, each of which has a cut edge formed by said knife and a curved portion leading from said edge to the body of said sheet.

6. In combination with a sheeting calender, a skiving cutter disposed adjacent said calender to engage a sheet of hard surface covering material formed on the calender and movable therewith to skive a narrow inclined portion therefrom longitudinally of the under surface of the sheet, and severing means positioned adjacent said calender and forward of said skiving cutter in the direction of travel of said sheet to engage said sheet and sever the same in the recessed area thereof into two sections, each of which has a cut edge formed by said severing means and an inclined portion leading from said cut edge to the body of said sheet.

VIRGIL SPENCER.

REFERENCES CITED

The following references are of record in the file of this patent:

UNITED STATES PATENTS

| Number | Name | Date |
| --- | --- | --- |
| 1,289,485 | Lewis | Dec. 31, 1918 |
| 1,402,160 | Gwozdz | Jan. 3, 1922 |
| 1,445,990 | Bourn | Feb. 20, 1923 |
| 1,628,836 | Gammeter | May 17, 1927 |
| 2,310,495 | Summersgill | Feb. 9, 1943 |
| 1,763,314 | McConoughey | June 10, 1930 |
| 1,004,027 | Holtkott | Sept. 26, 1911 |
| 1,256,658 | Cameron et al. | Feb. 19, 1918 |
| 1,651,837 | Richey | Dec. 6, 1927 |